June 12, 1945.  G. BURRELL  2,378,182
FLIGHT TEST PHOTOGRAPHIC RECORDING EQUIPMENT
Filed July 12, 1941  2 Sheets-Sheet 1
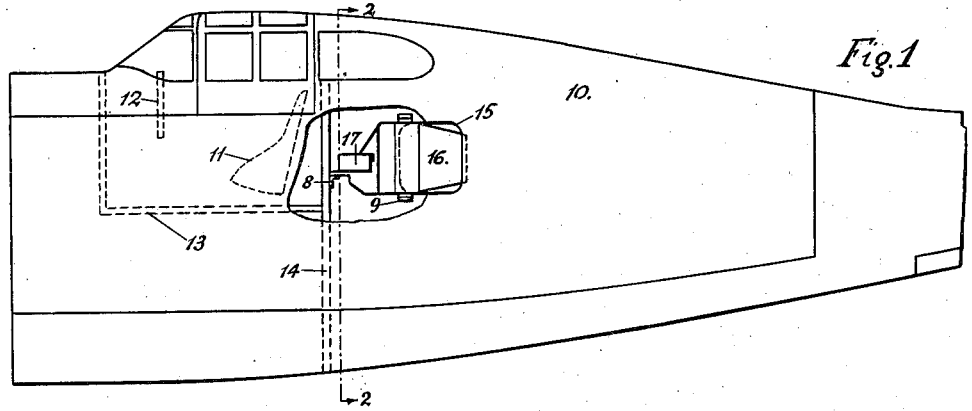
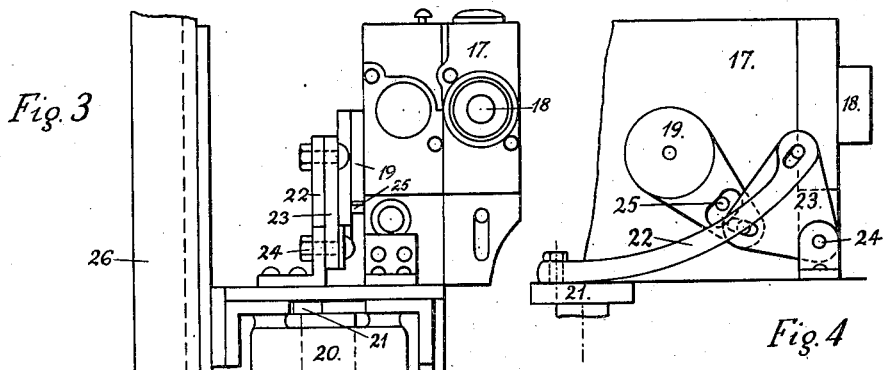
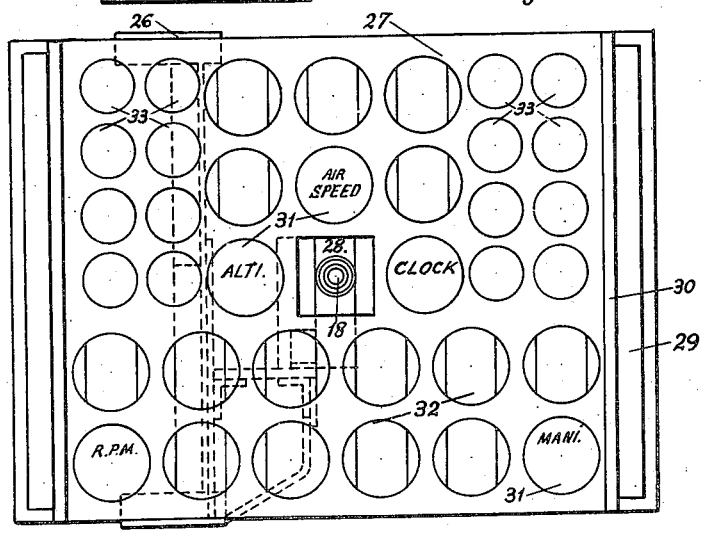
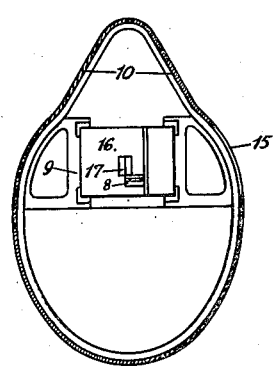
INVENTOR
George Burrell
BY Robert C Rasche
ATTORNEY

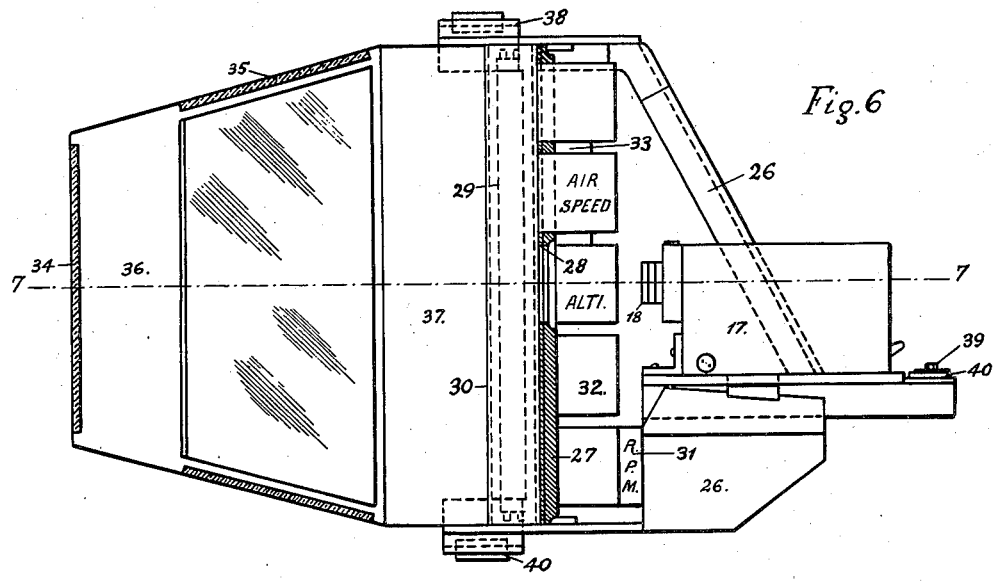
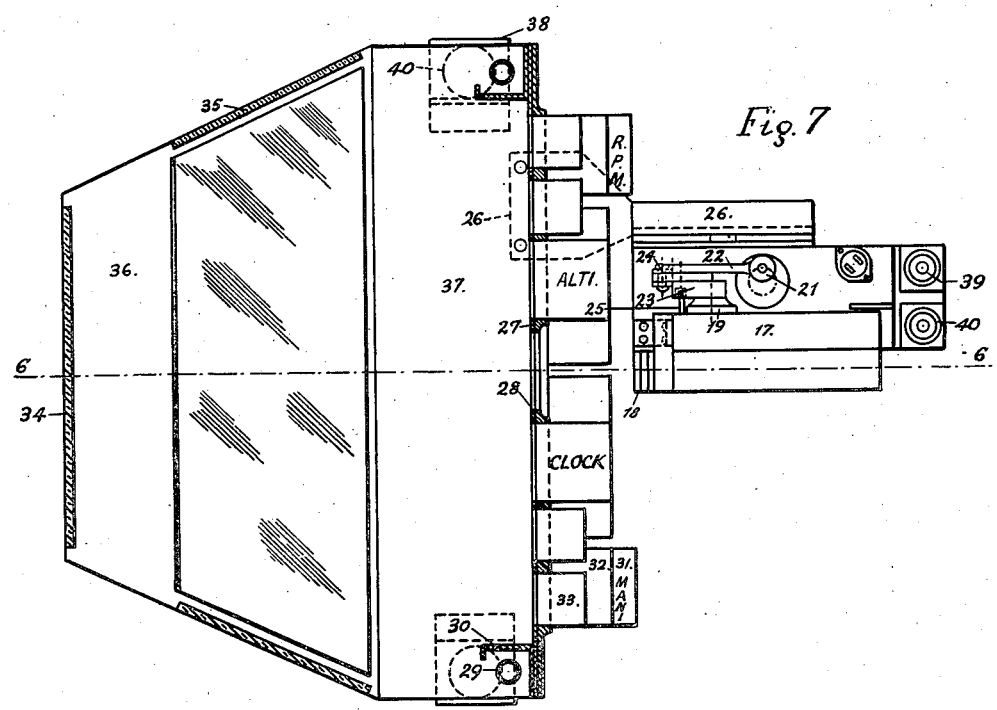

Patented June 12, 1945

2,378,182

UNITED STATES PATENT OFFICE 2,378,182

FLIGHT TEST PHOTOGRAPHIC RECORDING EQUIPMENT

George Burrell, Huntington, N. Y., assignor to Republic Aviation Corporation, a corporation of Delaware Application July 12, 1941, Serial No. 402,069

9 Claims. (Cl. 88—16)

This invention relates to improvements in flight test photographic recording equipments, in which the readings of flight instruments and additional flight testing instruments, mounted on an auxiliary panel, are photographed on a continuous film during test flights.

In known equipments of this type, a moving picture camera is operated intermittently by the pilot effecting the test each time he deems it useful or convenient to have a simultaneous record of the readings shown at the time by the different instruments on the auxiliary panel.

But, at very high altitudes and in high speed turns and pull-outs from dives, the pilot is often unable, due to momentary unconsciousness, to judge the most favorable time to take these pictures, or is too busy operating other controls to find time to push the button controlling the single frame release of the camera during the most critical periods of the test.

On the other hand, on these known equipments, use is generally made of a 35 mm. film, which is relatively expensive to develop and copy and the optical disposition of the auxiliary panel with respect to the objective of the camera is such that it is not possible to record simultaneously on a frame more than 12 to 16 readings, due to lack of space and lack of adequate lighting means, unless use is made of an additional source of electric current, independent of the usual generator and battery of the plane.

The object of the invention is to remedy the above-mentioned defects and limitations of the known equipments of this type and mainly to relieve the pilot from all recording preoccupations during the entire test flight.

The main feature of the improved flight test photographic recording equipment according to the present invention is the provision of means by which the operation of the moving picture camera of this equipment is made entirely automatic, i. e., by which this camera is started before the take-off and is thereafter run at the desired speed by means of its main spring and of an auxiliary electric motor so as to take automatically a slow motion picture of the auxiliary instrument panel during the entire test flight. The continuous recording of the readings of the instruments carried by this panel thus obtained is thereby rendered entirely independent from the shortcomings of the pilot and includes data, referring to critical periods of the test during take-off, dives, landing, etc., which cannot be accurately recorded with equipments of this type in present use.

Another feature is a special arrangement of the instruments on an apertured panel around the objective of the moving picture camera and such a relative positioning and dimensioning of this panel and a reflecting mirror connected thereto with respect to this objective that it becomes possible to use the more economical 16 mm. film and to record simultaneously on each frame of this film three to four times more instrument readings than with the equipments now in use.

A further feature is an indirect lighting arrangement, provided with a light-reflection and diffusion chamber and using as source of electric current the usual electric installation of the aircraft (generator and/or battery), which illuminates uniformly the panel without throwing light upon the objective of the camera and gives a clear reading of all recorded flight data when the picture is later on projected for study of these data.

Still another feature of this improved equipment is to make of the camera, its auxiliary electric motor, the instrument panel, the light diffusion and reflection chamber and the indirect lighting arrangement a single, compact unit, made of several detachable parts, which can easily and readily be taken apart, so as to be introduced separately through the relatively small side access door of the cockpit of the aircraft, and can then as readily be reassembled in this cockpit—preferably in the rear of the pilot's seat.

Other features of the invention will become apparent from the reading of the following description, made in reference to the accompanying drawings, showing as an example one embodiment of my improved flight test photographic recording equipment.

In these drawings:

Figure 1 is a side elevation of an aircraft with a part broken away to show how the equipment is mounted behind the pilot's seat;

Figure 2 is a vertical section on the line 2—2 of Figure 1;

Figure 3 is a front view of the equipment taken behind the instrument panel to show the moving picture camera, its electric motor and the mechanical connection between them;

Figure 4 is a detail view showing this mechanical connection by itself;

Figure 5 is a front view of the instrument board, or panel;

Figure 6 is a vertical section along the optical axis of the camera on the line 6—6 of Figure 7, and Figure 7 is a horizontal section along the optical axis of the camera on the line 7—7 of Figure 6.

Similar numerals refer to similar parts throughout the several views.

This improved flight test photographic recording equipment may be conveniently mounted in the fuselage behind the pilot's seat (as shown in Figures 1 and 2) on brackets 8 and 9.

10 indicates the fuselage of the aircraft under test, 11 the pilot's seat, 12 the usual control board, 13 the cockpit floor, 14 the pilot's cockpit rear bulkhead and 15 the side access door.

In these two figures the equipment according to the invention is generally designated by the numeral 16, while 17 indicates the moving picture camera. 18 (Figure 3) shows the objective of this camera.

The winding crank 19 of this camera is continuously and intermittently rewound in an amount corresponding to its loss of energy by means of an electric motor 20 (Figures 3 and 4) by the intermediary of an eccentric 21, a slotted connecting rod 22 and a crank lever 23, pivoted at 24, while the single frame release lever 25 of the camera is periodically pushed down at regular intervals so as to expose a single frame each time by means of this same connecting rod 22 and crank lever 23. The speed of this motor can be adjusted and is normally set to take, continuously, one frame per second during the entire test. This speed is kept constant by means of an adjustable governor, not shown.

No winding by hand of the spring is necessary as this motor rewinds the spring automatically.

The camera 17 and the motor 20 are mounted in a bracket 26 behind an auxiliary panel of instruments 27. (Figure 5.) In the center of this panel is provided, in front of the objective 18, a square opening 28. 29 indicates a pair of fluorescent lamps lodged along the lateral sides of the panel 27 outside the field of the camera 17. To prevent direct lighting of the instruments, use is made of two baffles, or deflectors, 30, while four reflectors 35 are arranged in front of these lamps 29 at such an angle that the light is uniformly diffused on the panel and prevented from interfering with the taking of the pictures.

In this embodiment, the auxiliary panel of instruments comprises: 5 flying instruments 31, 15 testing double-reading instruments 32 and 16 testing single-reading instruments 33, making in all 51 different readings.

A composite image of the auxiliary instrument panel (Figures 6 and 7) is formed opposite the objective 18 at a convenient distance on a mirror 34, mounted, perpendicularly to the optical axis of the camera 17, in a box 36 having the shape of the frustum of a pyramid and carrying the four light reflectors 35. This box 36 is detachably connected to the panel 27 by means of a rectangular frame 37, forming the lamphouse of the equipment.

The flight test photographic equipment thus assembled forms a compact unit which can be easily and quickly mounted in any convenient location of the fuselage, the wings or the bomb rack of the aircraft to be tested by means of four corner bolt fastenings 38, secured in the brackets 9 and a pair of rear bolt fastenings 39, fixed to the bracket 8. Both fastenings 38 and 39 are provided with conventional vibration dampers 40.

The operation of this equipment is as follows:

The mirror box 36, the lamphouse 37, with the instrument panel 27 and the camera 17 with its electric motor 20 are introduced as three separate parts through the side access door 15 and are then reassembled in the cockpit 10. The unit thus formed is then secured to the brackets 8, 9 by means of the bolt fastenings 38, 39.

At the time of the take-off, the electric motor 20 is started simultaneously with the clock of the auxiliary panel 27 and, from then on, the camera is automatically run so as to expose the frames at the rate of one every second during the entire test flight. If use is made of a 100 foot film, having about 4,000 frames, the equipment will thus record every second on a separate frame all the data shown by the 36 instruments, during a continuous test flight lasting over an hour. For longer flights, one could use 200 foot films, but, in practice, the 100 foot film is usually sufficient.

As this recording is entirely automatic, the pilot is completely relieved from all recording preoccupation and can thus concentrate all his attention upon his piloting and the different stages of the test.

Having now made certain the nature and purposes of my invention, and at least one mode of executing same, in such manner to as enable anyone skilled in the art to which it appertains, to make and use same, as required by the statutes, that which I claim as my invention, and desire to secure by Letters Patent of the United States is:

1. A photographic apparatus, comprising: a camera having an objective; a subject-support mounted in alignment with, and surrounding, the optical axis of said objective and carrying the subjects facing away from the objective, and means on the same side of the camera as the objective for convergingly-concentrating images of said subjects onto the front of said objective on the same side of the camera as the objective and reflecting the images thru said aperture to strike the front of the film in said camera.

2. A plurality of photographic apparatus components for separately inserting into constricted interiors having no access opening large enough to permit bodily insertion of the assembled apparatus, comprising: a frame carrying a motor-driven motion picture camera; a lamphouse carrying a frame bearing reverse-facing photographic subjects to be automatically photographed by said camera and adapted to be arranged in front of said camera, said frame having a central aperture; a chamber carrying diffusion-means and reflecting means in its interior and adapted to be arranged on the distal end of said lamphouse for reflecting images of said reverse-facing subjects thru said aperture into the camera; interengageable means on the lamphouse and on the camera-supporting frame for detachably mounting the lamphouse and subjects-support on said camera-support inside said constricted interior; and interengageable means on said lamphouse and on said diffusion-chamber for detachably mounting said chamber on said house within said constricted interior.

3. A photographic recording apparatus comprising a support, a camera mounted on said support, a reflecting surface mounted anterior to and facing the objective thereof, and an instrument panel between said objective and said reflecting surface, said panel carrying instruments with their faces positioned on the side of the panel facing the reflecting surface and having an opening aligned with the objective, the instruments on said panel covering an area substantially equal to the area of the field viewed by the objective in the approximate plane of the panel.

4. A photographic recording apparatus comprising a support, a camera mounted thereon, a mirror, a light reflecting and diffusing chamber mounted on said support and carrying said mirror with its reflecting surface directed toward the objective of said camera, a panel mounted on said support adjacent the camera and having a substantially central aperture aligned with said objective and supporting subjects to be photographed grouped about said opening on the opposite side of the panel to the camera, a light source mounted on said support between said chamber and said panel, said light source and chamber being disposed on the subject carrying side of the panel, and light-baffles cooperating with the light source to prevent direct illumination of the subjects carried by the panel.

5. A photographic recording apparatus comprising a camera, a subject support mounted in front of the camera, with the subjects carried thereby facing away from the camera objective, light sources mounted at the edges of said subject support on the side thereof facing away from the camera, light baffles combined with said light sources to prevent direct illumination of the subjects carried by the support, and a light reflecting and diffusing chamber located on that side of the subject support remote from the camera and including lateral reflectors and a central reflecting surface facing the camera objective, for reflecting an image of the subjects into said objective, said lateral reflectors being arranged to reflect the light from said light source to illuminate the subjects carried by the subject support.

6. A photographic apparatus comprising a frame, a camera mounted thereon, a support mounted on the frame adjacent the camera objective and carrying a plurality of subjects facing in the same direction as the camera objective, said support having an aperture aligned with the camera objective, a light source adjoining said support on the subject side thereof, baffles to prevent direct illumination of said subjects by said source, and a diffusion chamber comprising a mirror parallel to the support and aligned with the aperture therein, and having its reflecting surface facing the subjects carried thereby and a series of laterally disposed mirrors arranged about the axis of the objective and angularly positioned with respect to the first mirror for diffusing light from said source and reflecting it to the subjects.

7. A photographic apparatus comprising a camera having an objective, a subject support mounted in alignment with and surrounding the optical axis of said objective and carrying subjects all facing in the same direction as the objective, and reflecting means positioned to reflect an image of all of the subjects to the objective and lying within the angle of view of the objective.

8. The combination with a camera having an objective, of a panel positioned in front of said camera and across the optical axis of its objective, said panel having an opening therein aligned with said objective, a plurality of instruments carried by said panel on the side facing away from the camera and grouped about said opening, a mirror facing said instruments and spaced from and parallel to said panel and lying within the angle of view of said objective through said opening, a series of mirrors each positioned at an obtuse angle to the plane of the first mirror arranged about the axis of the objective and on the instrument side of the panel, light sources adjacent the edges of said panel on the instrument side thereof, and baffles cooperating with said light sources to prevent direct illumination by said sources of the instruments carried by said panel, said series of mirrors being positioned to receive light from said sources and reflect it to said instruments.

9. In a flight test recording apparatus, the combination with an aircraft, of a removable panel to be inserted in any convenient space in the fuselage of the aircraft, a plurality of flight test instruments attached to said panel to face all in the same direction and to be temporarily and operatively connected to selected test points of the aircraft, a camera located relatively close to the panel and facing in the same direction as the instruments on said panel, a mirror positioned to face said instruments and reflect an image of all of them into the objective of the camera, whereby the field of the camera is enlarged to embrace all of the instruments, and means for operating said camera at predetermined time intervals.

GEORGE BURRELL.